June 4, 1929.  O. C. KALBFLEISCH  1,715,927
VULCANIZING APPARATUS
Filed Aug. 8, 1927   4 Sheets-Sheet 3
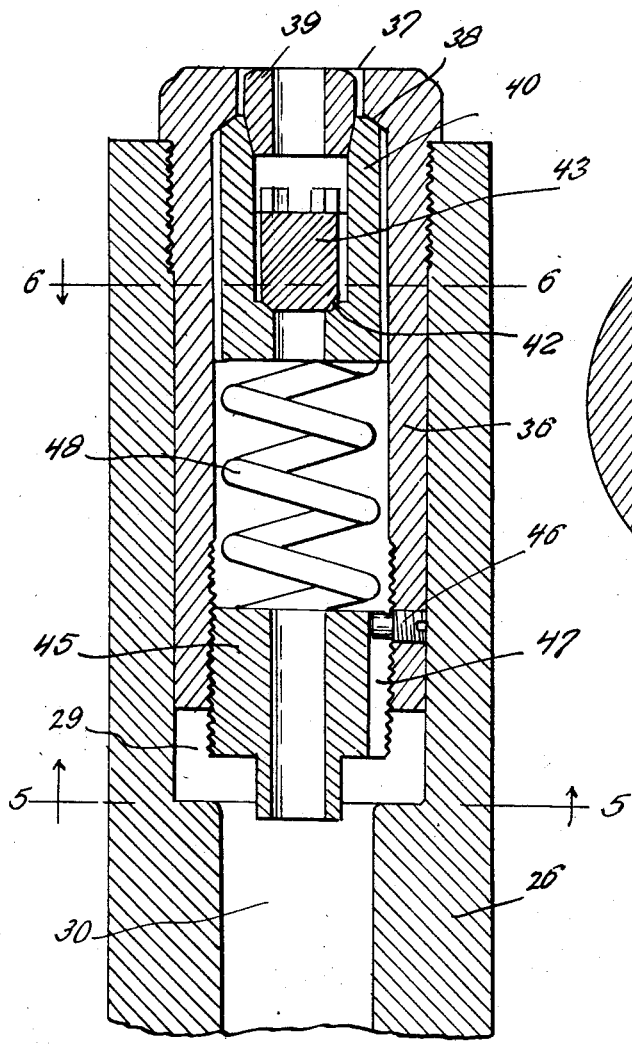
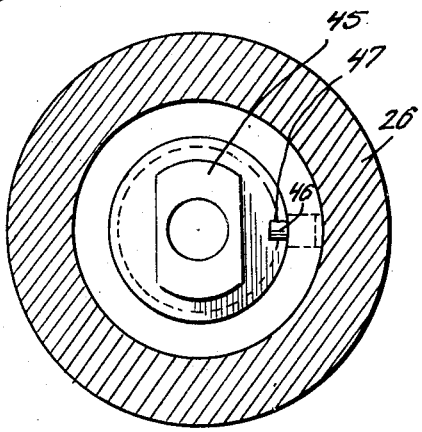
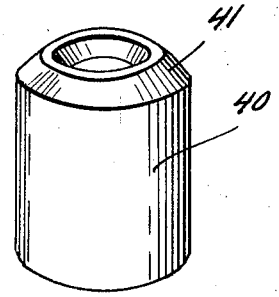
Inventor
O. C. Kalbfleisch
By Clarence A. O'Brien
Attorney

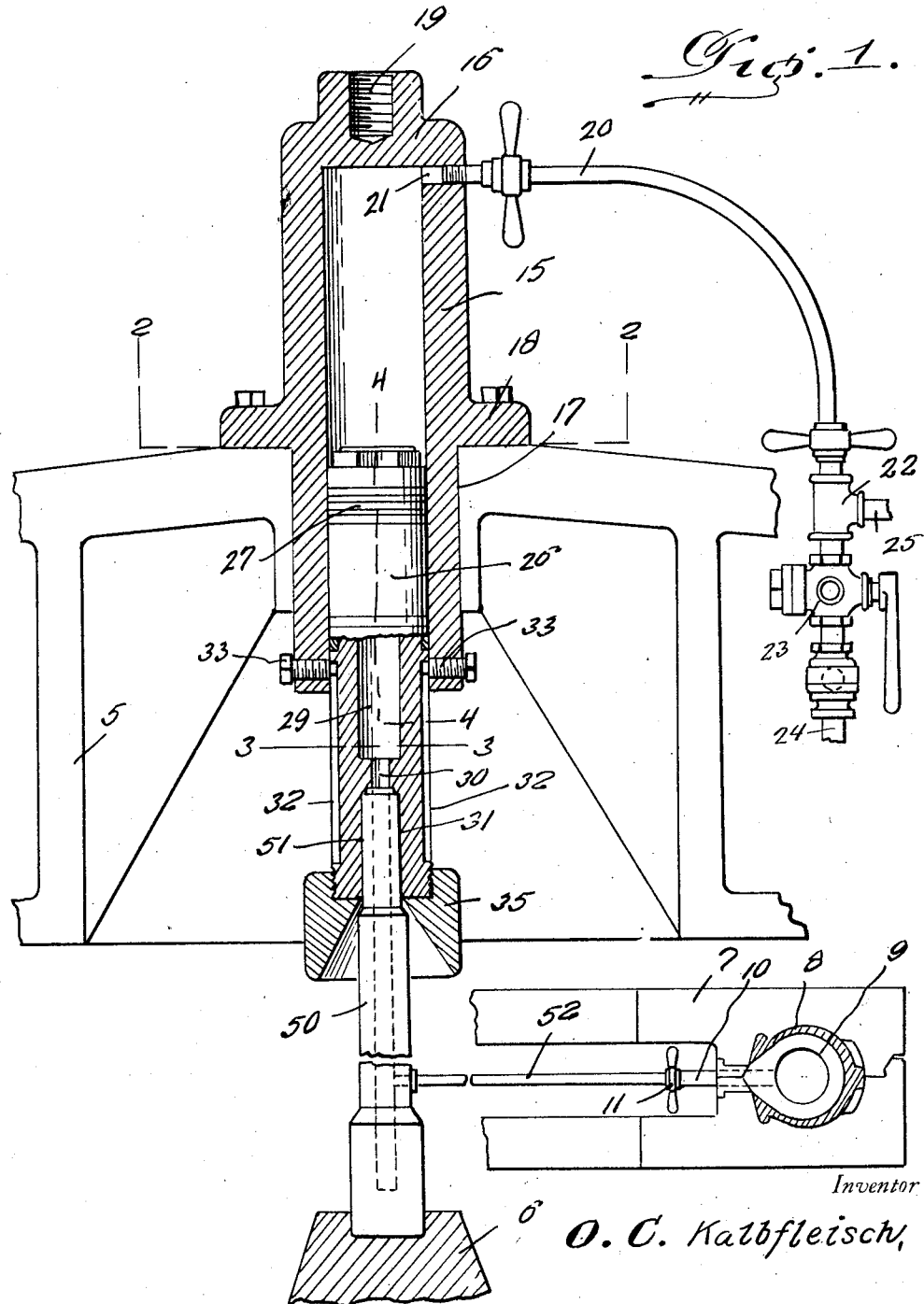

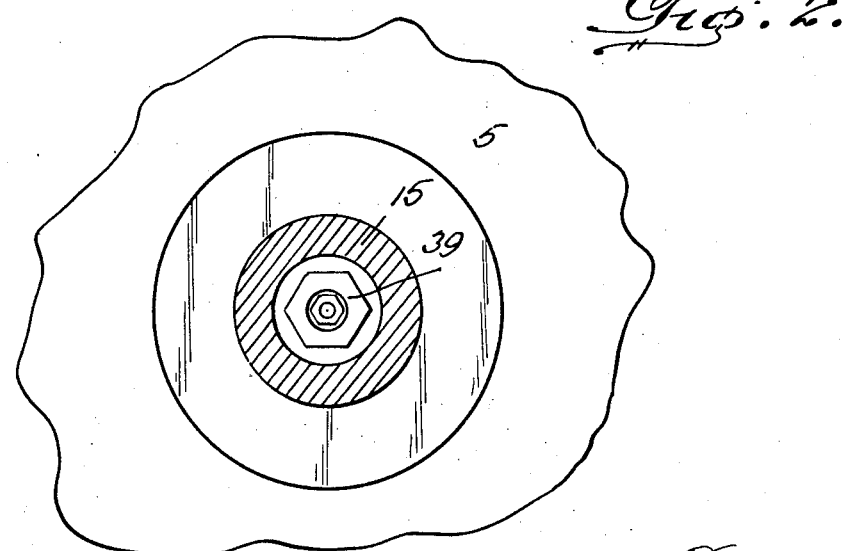
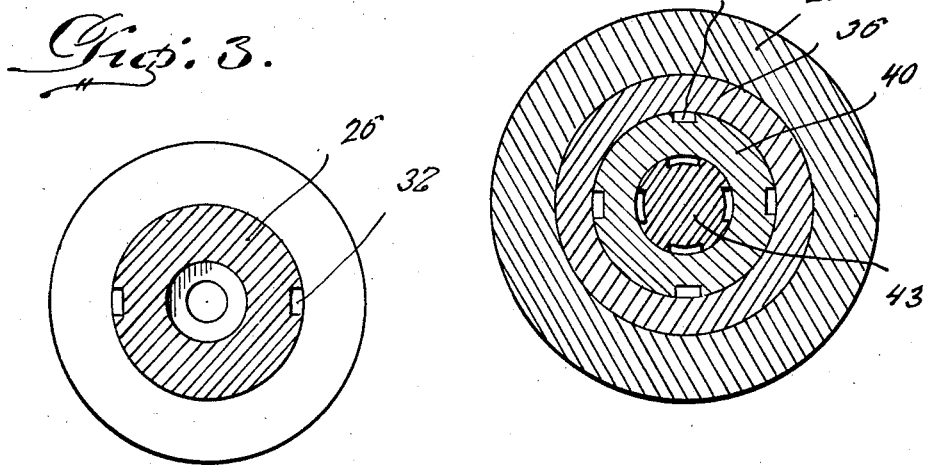

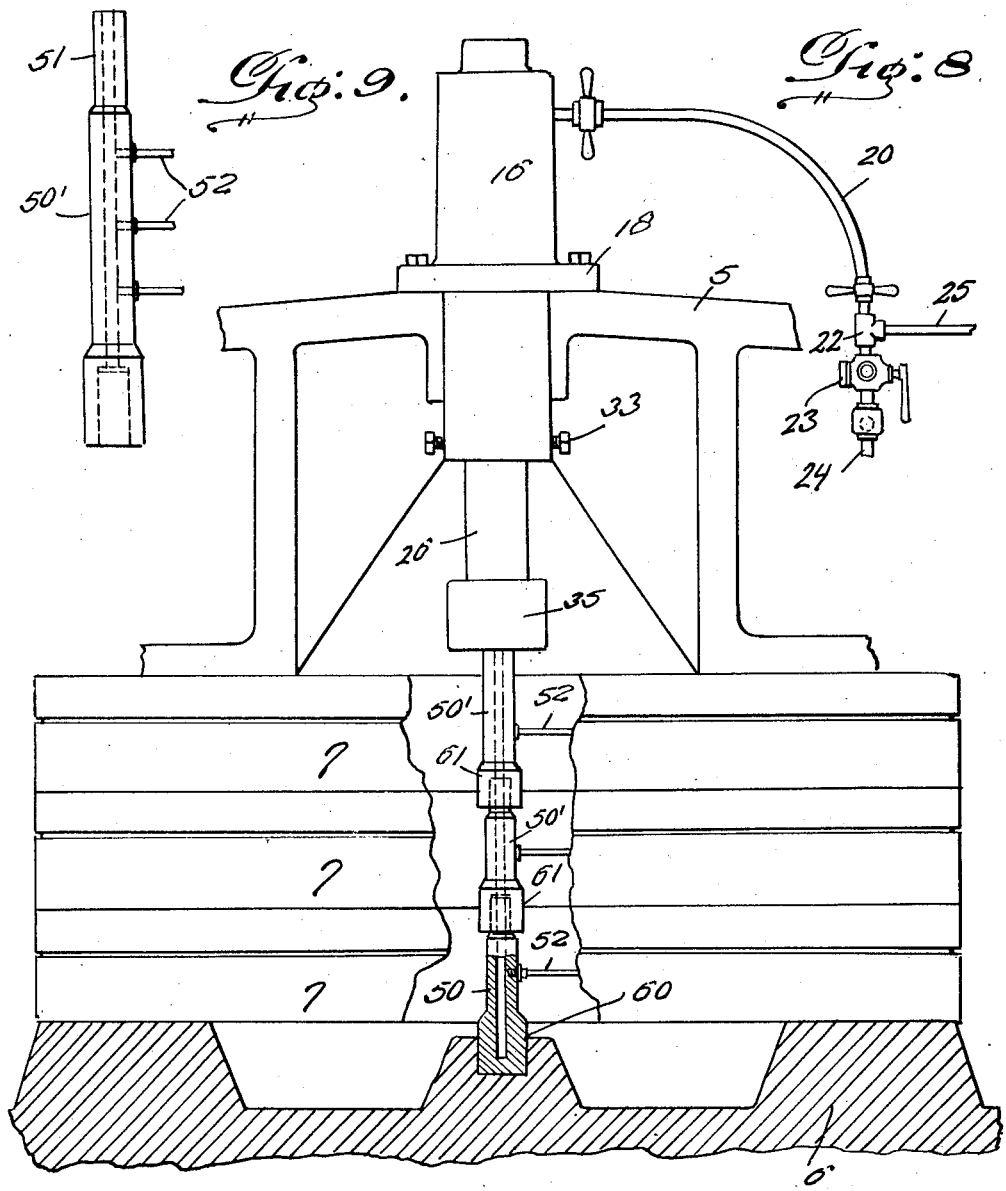

Patented June 4, 1929.

1,715,927

UNITED STATES PATENT OFFICE.

OSCAR C. KALBFLEISCH, OF MANSFIELD, OHIO.

VULCANIZING APPARATUS.

Application filed August 8, 1927. Serial No. 211,515.

The present invention relates to apparatus for vulcanizing hollow articles under internal fluid pressure and is especially applicable to apparatus for so vulcanizing pneumatic tire casings. Vulcanizers of this general type customarily comprise a hydraulic ram between the platens of which the mold forms containing the article to be vulcanized, are assembled and maintained in mating relation by the pressure from the ram. In the vulcanizing of hollow objects, such as pneumatic tires, the article is inflated to expand it into the molding cavity of the mold members.

The general object of the invention is to provide improved, readily assembled and disassembled means for conducting pressure fluid into several articles contained in molds stacked upon each other, as in the case of the molds stacked in a vertical vulcanizer or heater press.

A more specific but very important object of the invention resides in the provision of a pressure delivering manifold structure comprising a plurality of sections held coupled together by means of a novel structure through the medium of the source of pressure, before air actually passes into the vulcanizing system.

A still further very important object of the invention resides in the provision of an apparatus of this nature which is simple in its construction, inexpensive to manufacture, strong and durable, convenient to handle, clearly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a sectional elevation of an apparatus embodying the features of my invention showing a single manifold unit in use, Figure 2 is a horizontal transverse section taken substantially on the line 2—2 of Figure 1, Figure 3 is a similar section taken substantially on the line 3—3 of Figure 1, Figure 4 is an enlarged vertical detail section taken substantially on the line 4—4 of Figure 1, Figure 5 is a transverse section taken substantially on the line 5—5 of Figure 4, Figure 6 is a transverse section taken substantially on the line 6—6 of Figure 4, Figure 7 is a perspective view of a valve used with the apparatus, Figure 8 is an elevation partly in section showing several of the manifold sections in use, and Figure 9 is a detail elevation of a manifold section showing several outlets therefrom.

Referring to the drawing in detail, it will be seen that the numeral 5 denotes the removable head of the vulcanizer, the numeral 6 denotes the platen of the ram, which is sometimes known as a spider. One or more sectional mold forms 7 are piled on the platen or spider 6 in the usual well known manner and each of these forms contain the shoe 8 with the bag 9 therein, said air bag having a conduit 10 leading therefrom with a coupling 11 on the end thereof.

As is well known, the pressure of the ram upwardly toward the removable head 5 maintains the sections of the forms together and air pressure is directed to the air bags so as to provide the proper cavity in the casing. The parts thus far described are of conventional formation and well known in the art, and have been fragmentarily illustrated merely for the purpose of bringing out the utility of my improved apparatus.

The numeral 15 denotes the cylinder, the upper end of which is closed as at 16, while the lower end thereof is open. This cylinder is adapted to project through an opening 17 in the head 5 and a flange 18 is provided on the exterior of the cylinder to rest on the top of the head 5 so as to support the cylinder in place. A threaded socket 19 is provided in the top end of the cylinder in order that implements or the like may be engaged therein for manipulating said cylinder. A pipe 20 leads to the upper interior of the cylinder 15 through an opening 21, this pipe 20 leads from a T-coupling 22, one branch of which is connected with the valve 23 leading from a pipe 24 extending from a suitable source of fluid pressure. The other branch of the T-coupling 22 has a branch 25 leading to a safety valve structure of suitable or any well known or conventional construction.

A hollow piston 26 is slidable in the cylinder 5 and has a plurality of packing rings 27 thereon. This hollow piston has a relatively large bore 29 merging into a restricted bore 30 which in turn merges into a relatively larger bore 31 at the lower end which is in the nature of a socket. Longitudinally extending diametrically opposed channels 32—32 formed on the exterior of the piston at the lower end thereof into which extend the reduced ends of the screws 33—33 to limit the movement of the piston in the cylinder and to prevent the rotation of the piston in the cylinder. A guide head 35 is threaded on the lower end of the piston and has an upwardly tapering recess leading to the socket bore 31. A sleeve 36 is threaded in the upper portion of the bore 29 and has a restricted opening 37 in the upper end thereof forming a valve seat 38, a spider structure 39 is mounted in the restricted opening 37. A cylindrical valve 40 has its upper edge beveled as at 41 to seat on the seat 38. The lower interior of the valve 40 is restricted to form a shoulder 42 on which is restable a check valve 43. A hollow plug 45 is threaded in the bottom end of the sleeve 36 and is locked against displacement by a screw 46 extending into a groove 47. This hollow plug 45 may be adjusted for tensioning a coil spring 48 disposed in the sleeve 36 and impinging against the cylindrical valve 40 and the plug 45 to normally hold the valve 40 closed on the seat 38.

A manifold conduit section 50 such as is shown in Figure 1 has a reduced upper end 51 to be received in the socket 31 and has a lateral tube 52 extending therefrom for engagement with the coupling 11. This section 50 has its lower end closed.

In view of the foregoing it will therefore be understood that by reason of the construction herein shown and described the spring 48 will hold the valve 40 closed until a required pressure has been obtained upon the piston 26, which in turn bears down upon the manifold sections in the system and therefore makes a tight connection between said manifold sections.

Now, in referring to pressures, spring 48 is adjustable and bearing in mind that original and total sources of air pressure in vulcanizing, ranges from 150 to 300 pounds per square inch, said spring 48 is therefore adjusted to whatever pressure the individual may desire, and if adjusted to withstand 50 pounds of pressure per square inch, it will necessarily follow that when 51 pounds or more is placed upon it that the valve 40 shall allow the pressure to enter into the vulcanizing system, and that when such opening occurs, and thereafter until the pressure is released, it will be seen that there is never a release of the pressure upon the manifold sections, and for every pound of pressure per square inch that is upon the piston 26 there is six and one-half pounds down push or pressure upon the manifold sections. In this example the section 50 sits in a recess 60 provided in the platen or spider 6 as is more clearly illustrated in Figure 8. Now in Figure 8 I have shown sections 50′ which are hollow all the way through and have their lower ends 61 in the form of sockets so that these sections 50 and 50′ may be assembled as is clearly shown in Figure 8 where a plurality of the molds are used piled one upon the other as is quite a common custom, and each of the sections 50 and 50′ will have one or more of the tubes 52 extending therefrom to the air bag. The use of a plurality of tubes is illustrated in Figure 9, where a plurality of these manifold conducting sections 50 are used, it will be seen that the 1300 pounds pressure will be used for holding them firmly coupled together. If the source of pressure should become out of order or become too low, the pressure in the air bag 9 will be relieved through the opening of check valve 43 to escape into the cylinder 15 through the conduit or pipe 20 and through the branch 25 and escape through the safety valve which is not shown but may be of any conventional or well known construction.

From the above detailed description it will be seen that I have devised an exceedingly simple apparatus which does away entirely with the necessity of the various contraptions and means which are now provided for coupling together the manifold sections to deliver the proper pressure to the air bag. Thus the structure devised by me affords ease of assembly and disassembly, may be manufactured at a low cost, be thoroughly efficient and reliable in operation and otherwise well adapted to its purpose.

The present embodiments of the invention have been disclosed merely by way of example since in actual practice they attain the features of advantage enumerated as desirable in the statement of the invention and the above description.

It will be apparent that changes in the details of construction, and in the combination and arrangement of parts may be resorted to without departing from the spirit and scope of the invention as hereinafter claimed or sacrificing any of its advantages.

Having thus described the invention, what I claim as new and desire to secure by Letters Patent is:—

1. An apparatus of the class described for applying pressure to the air bags in a vulcanizing mechanism, a plurality of manifolds, means for delivering air pressure to the manifolds, means whereby a portion of said pressure may be utilized for holding said manifolds together, said last mentioned means comprising a valve, a spring holding the valve closed until a predetermined pressure has been reached, said valve being mounted in a piston, and said piston impinging against the manifolds to hold them coupled together.

2. In an apparatus of the class described, a cylinder, a piston slidable in the cylinder, said piston being hollow, a valve seat in the piston, a valve associated with the seat and mounted in the piston, a spring pressing the valve against the seat.

3. In an apparatus of the class described, a cylinder, a piston slidable in the cylinder, said piston being hollow, a valve seat in the piston, a valve associated with the seat and mounted in the piston, a spring pressing the valve against the seat, means for limiting the sliding movement of the piston in the cylinder.

4. In an apparatus of the class described, a cylinder, a piston slidable in the cylinder, said piston being hollow, a valve seat in the piston, a valve associated with the seat and mounted in the piston, a spring pressing the valve against the seat, means for limiting the sliding movement of the piston in the cylinder, means for tensioning the spring.

5. In an apparatus of the class described, a cylinder, a piston slidable in the cylinder, said piston being hollow, a valve seat in the piston, a valve associated with the seat and mounted in the piston, a spring pressing the valve against the seat, means for limiting the sliding movement of the piston in the cylinder, means for tensioning the spring, the outer end of the piston being provided with a socket, and a manifold section having one end receivable in the socket.

6. In an apparatus of the class described, a cylinder, a piston slidable in the cylinder, said piston being hollow, a valve seat in the piston, a valve associated with the seat and mounted in the piston, a spring pressing the valve against the seat, means for limiting the sliding movement of the piston in the cylinder, means for tensioning the spring, the outer end of the piston being provided with a socket, a manifold section having one end receivable in the socket, one or more other manifold sections, all of said manifold sections having sockets so that they may be put together in end to end relation, tubes leading laterally from the sections, the bottom section being closed at its bottom end.

7. In an apparatus of the class described, a cylinder, a piston slidable in the cylinder, said piston being hollow, a valve seat in the piston, a valve associated with the seat and mounted in the piston, a spring pressing the valve against the seat, means for limiting the sliding movement of the piston in the cylinder, means for tensioning the spring, the outer end of the piston being provided with a socket, the manifold section having one end receivable in the socket, one or more other manifold sections, all of said manifold sections having sockets so that they may be put together in end to end relation, tubes leading laterally from the sections, the bottom section being closed at its bottom end, guide beams on the outer end of the piston to facilitate the insertion of one of the sections therein.

In testimony whereof I affix my signature.

OSCAR C. KALBFLEISCH.